INVENTOR
S. W. BEYLAND
BY
ATTORNEY

TELETYPEWRITER STORAGE CONTROL SYSTEM

Filed Dec. 31, 1957 6 Sheets-Sheet 2

INVENTOR
S. W. BEYLAND
BY
[signature]
ATTORNEY

INVENTOR
S. W. BEYLAND
BY
ATTORNEY

Dec. 20, 1960 S. W. BEYLAND 2,965,713

TELETYPEWRITER STORAGE CONTROL SYSTEM

Filed Dec. 31, 1957 6 Sheets-Sheet 4

INVENTOR
S.W. BEYLAND
BY
ATTORNEY

INVENTOR
S.W. BEYLAND
BY
[signature]
ATTORNEY

INVENTOR
S.W. BEYLAND
BY
ATTORNEY

United States Patent Office 2,965,713
Patented Dec. 20, 1960

2,965,713

TELETYPEWRITER STORAGE CONTROL SYSTEM

Sidney W. Beyland, Valhalla, N.Y., assignor to American Telephone and Telegraph Company, a corporation of New York Filed Dec. 31, 1957, Ser. No. 706,343

3 Claims. (Cl. 178—17.5)

This invention relates to telegraph switching systems and particularly to a teletypewriter control system including switching equipment for automatically retransmitting selected portions of incoming messages to a receiving instrumentality for subsequent relay in accordance with directing characters preceding the message and included in the text of the message.

An object of the invention is to suppress transmission by a reperforator transmitter of selected portions of received message traffic in order to permit only the remaining portions of message material to be transmitted to a typing reperforator for subsequent retransmission.

Another object of the invention is to store switching and discard intelligence for a plurality of messages and thereby to control the subsequent transmission relay of those messages.

A further object of the invention is the processing of message data responsive to control signals present in the message data received.

The invention features a multilevel electronic intelligence storage arrangement activated by directing characters present in incoming message data and operable to control the retransmission of selected portions of that message data.

In addition the invention features a selector circuit in association with the storage arrangement to control the parallel sequential read in and read out of control intelligence to the storage arrangement.

The preferred embodiment of the invention comprises a control reperforator transmitter and associated circuitry adapted to suppress transmission by that reperforator transmitter of selected portions of received message traffic in order to permit only the remaining portions of message material to be transmitted to a typing reperforator for subsequent retransmission. Each incoming message is received by the control reperforator and as the directing characters at the beginning of a message are recorded, selector mechanism contacts in the reperforator, actuated in response thereto, control the energization of directing and discarding relays in a relay storage bank. The transmitter portion will not begin to transmit a message until end-of-message signals terminating that message are received by the reperforator. In accordance with the information stored in the relay storage bank, the transmitter will either transmit to its associated typing reperforator or discard. In the embodiment illustrated herein directing information for eleven messages may be stored, therefore, the transmitter may lag eleven messages behind its associated reperforator. A rotary selector associated with the reperforator enables the directing information to be read into the relay storage bank in parallel and a second rotary selector associated with the transmitter enables parallel read out from the relay storage bank of the information coded, thereby to control discarding of message material.

Figures 1, 7:
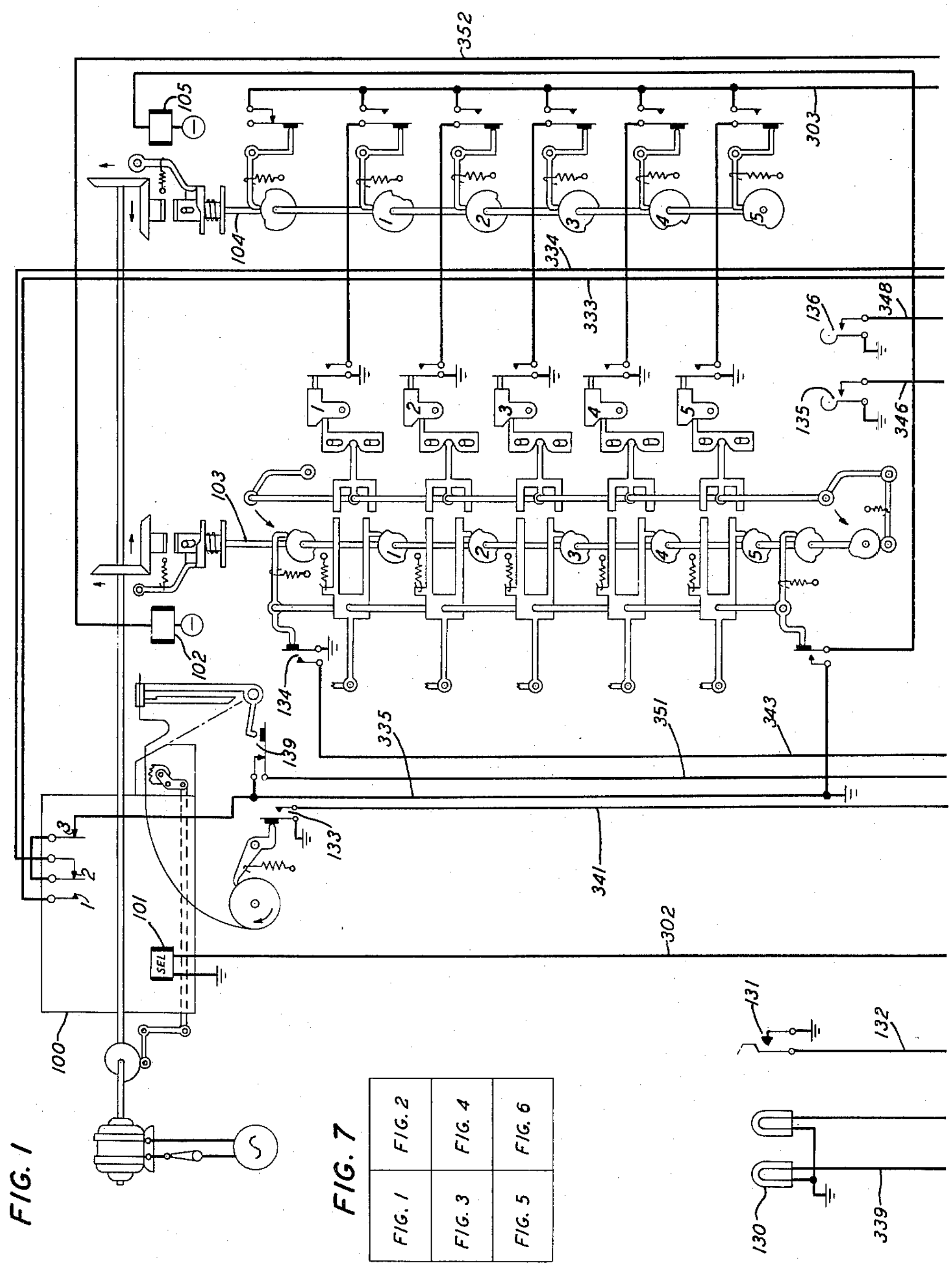

Figs. 1 through 6 of the drawing, when arranged as shown in Fig. 7, show the teletypewriter control system intended to transmit to a typing reperforator only selected portions of incoming message traffic.

Preliminary to a detailed description of the circuit, its operation will first be described generally.

In the designations of the apparatus the first numeral corresponds to the figure number on which the apparatus appears. Conductors extending between figures bear the same designation in all figures.

Figure 2:
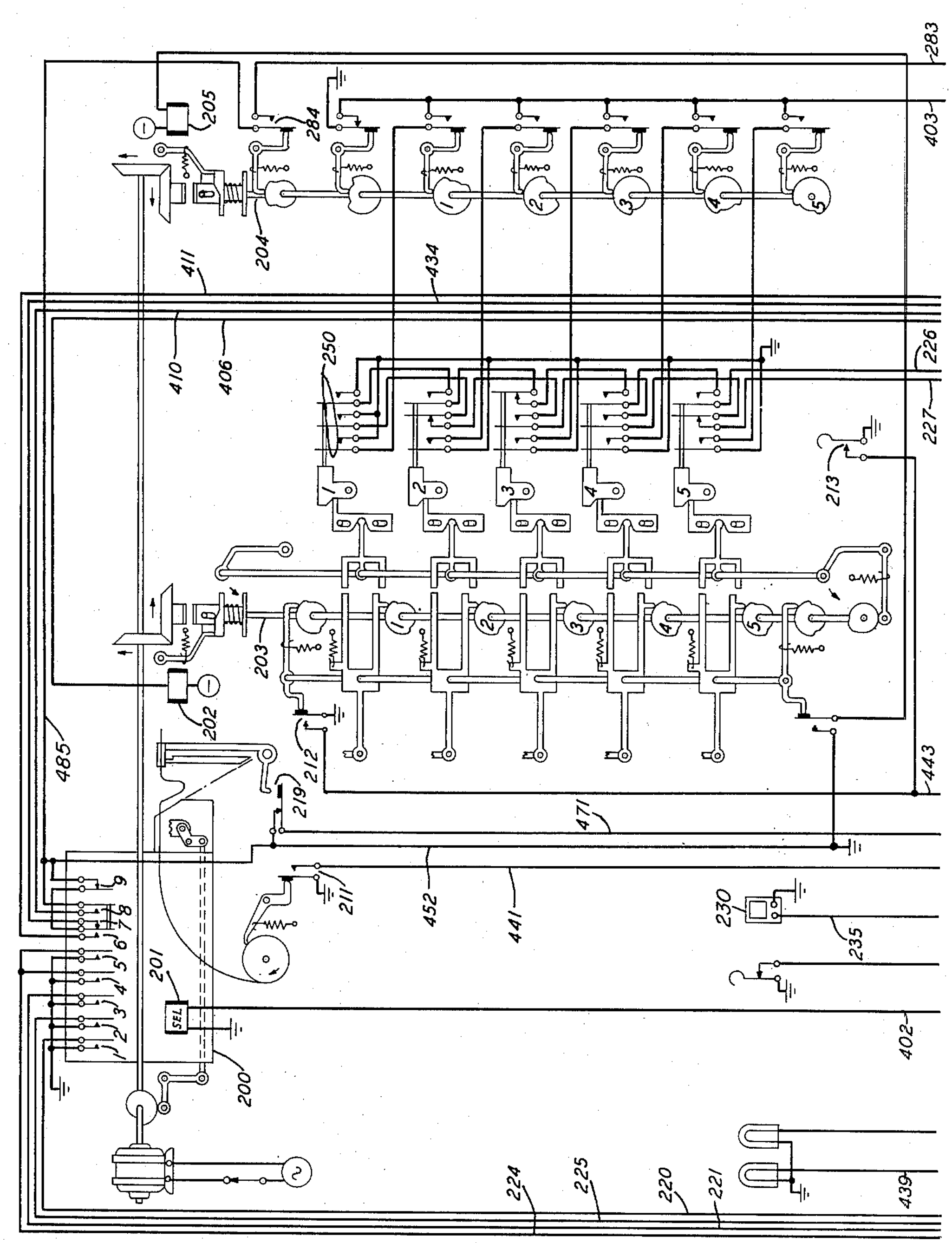
Figure 3:
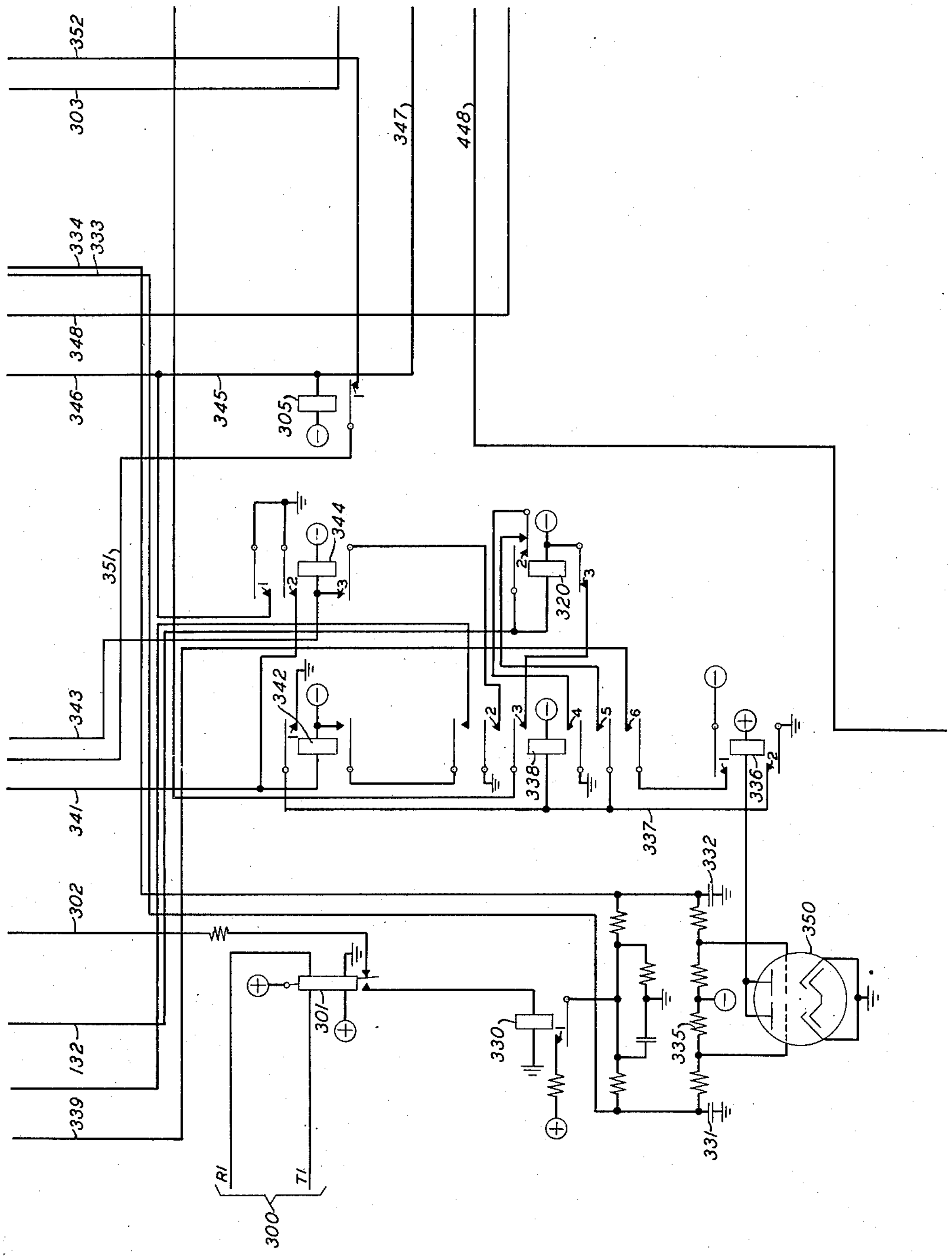
Figure 4:
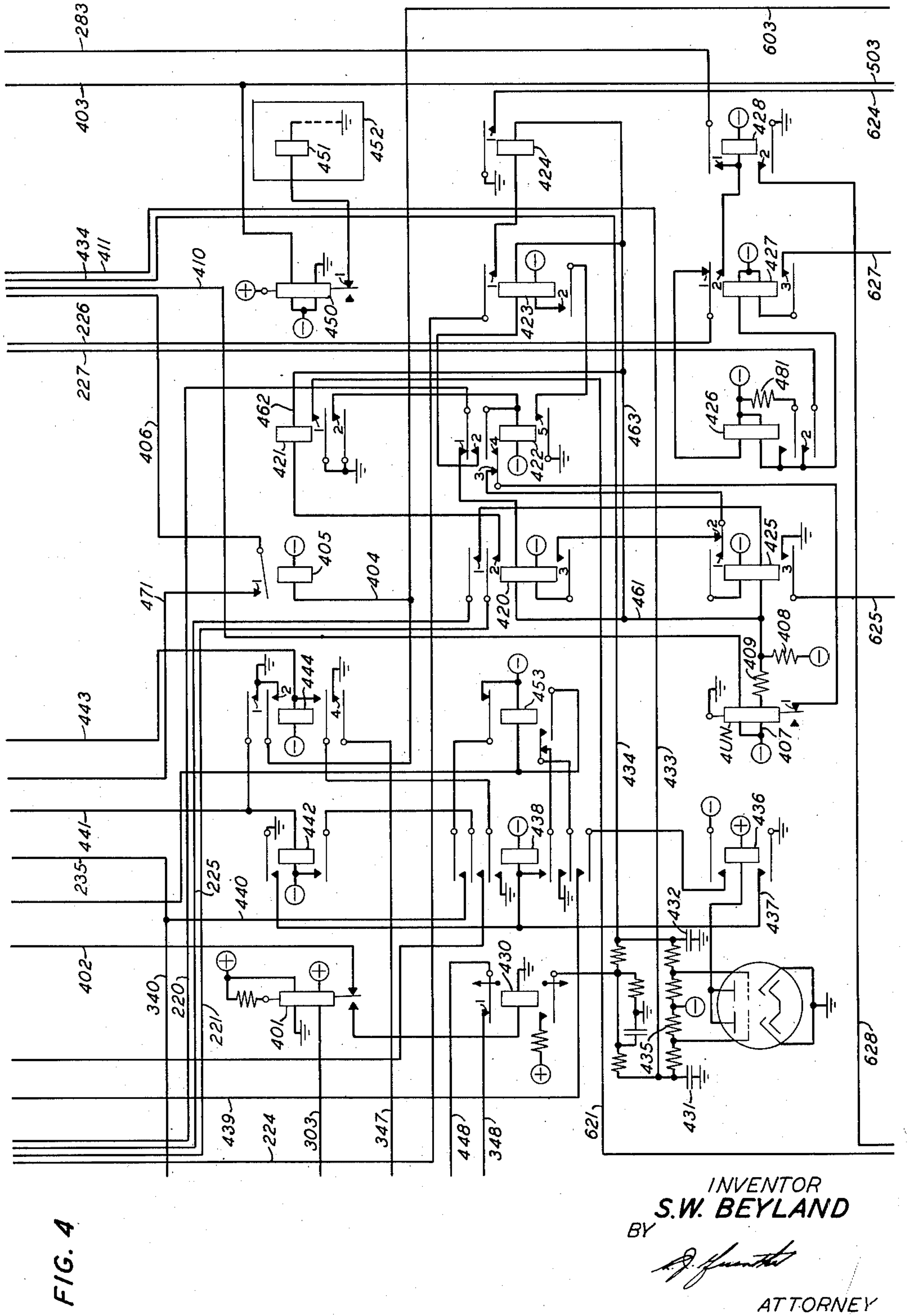
Figure 5:
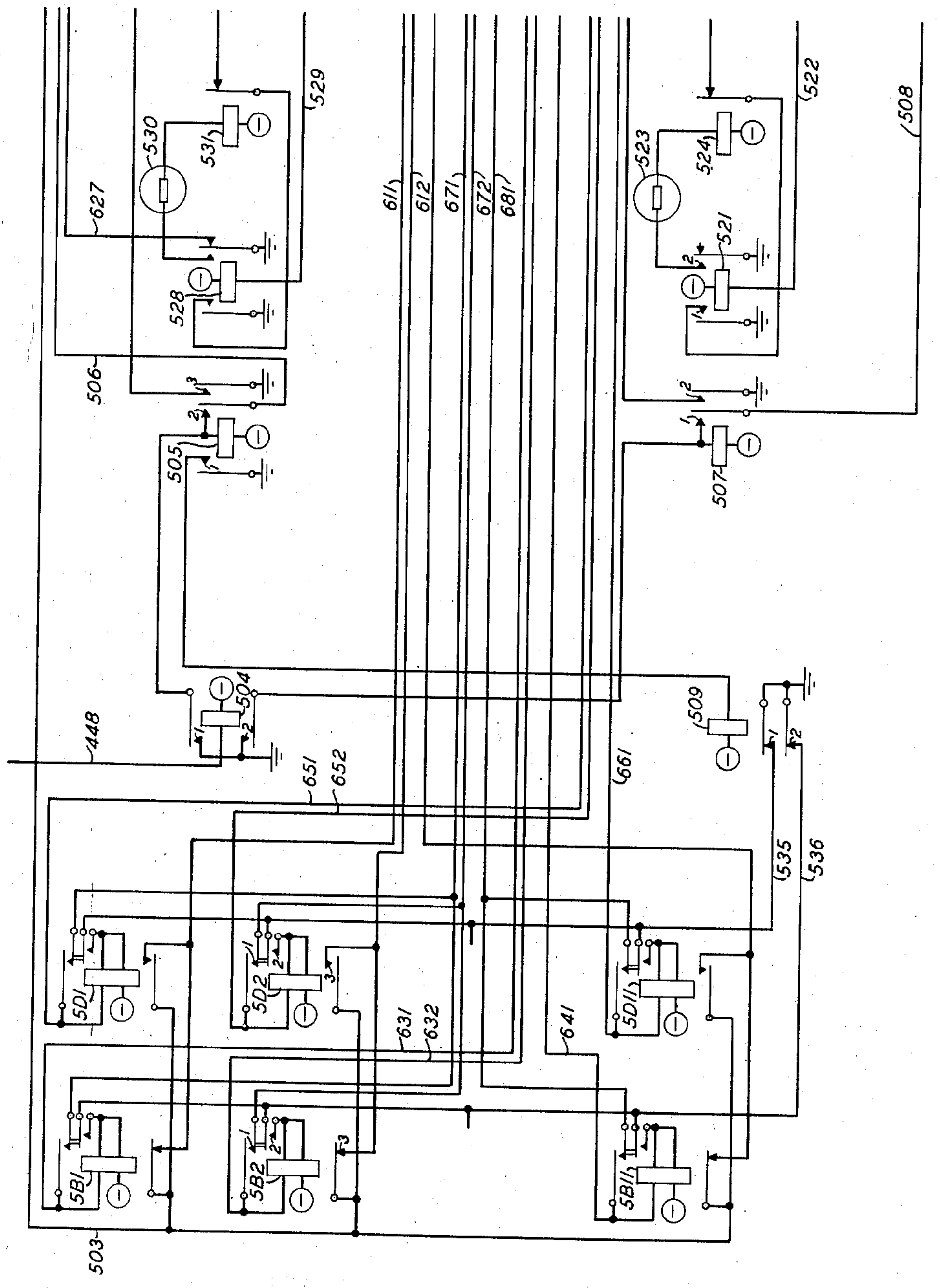
Figure 6:
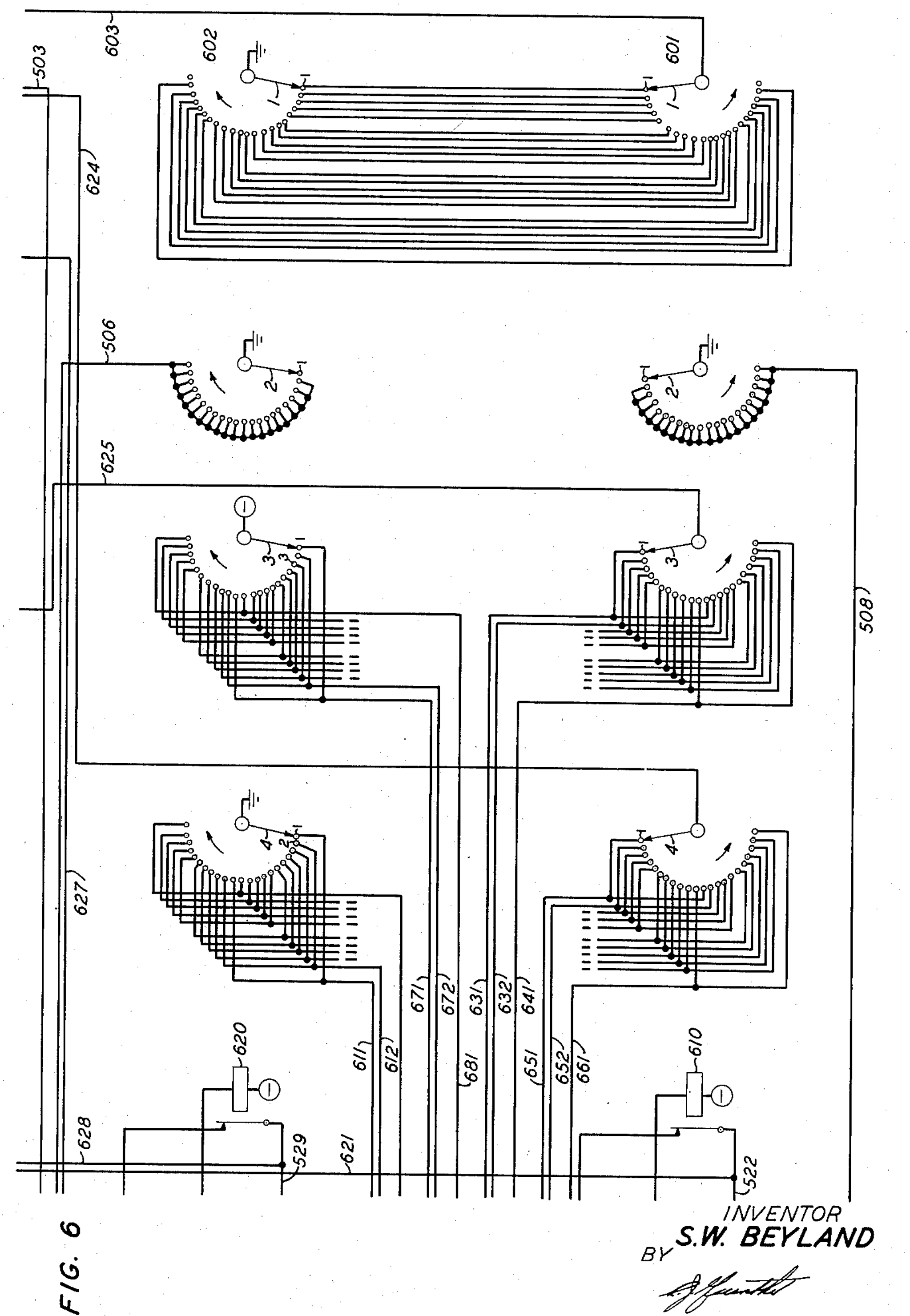

Referring now to Figs. 1 through 6, the line reperforator transmitter 103, and the control reperforator transmitter 203, are shown in the middle of Figs. 1 and 2 respectively. These may be of the type shown and described in United States Patent 2,430,447, granted to D. E. Branson et al., on November 11, 1957, the disclosure of which patent is hereby made a part of this disclosure as if fully included herein. Each of the reperforators 103 and 203 of Figs. 1 and 2 is provided with a selector mechanism comprising a plurality of contacts closeable in response to certain signals received by that reperforator. The selector mechanisms are represented by the enclosed rectangular areas 100 and 200 in Figs. 1 and 2, respectively. Fig. 6 shows rotary selectors 601 and 602 which are associated with and controllable by the aforementioned selector mechanism contacts. Fig. 5 shows the relay storage banks 5B1, 5B2 . . . 5B11 and 5D1, 5D2 . . . 5D11. Fig. 4 includes the typing reperforator 452 and receiving magnet 451 that prepares the final tape for subsequent retransmission. This typing reperforator may be of any suitable type such as the type disclosed and described in detail in United States Patent 2,042,788, granted to H. L. Krum, on June 2, 1936, the disclosure of which patent is hereby made a part of this disclosure as if fully included herein.

The circuit control arrangement of Figs. 1 through 6 functions to hold each incoming message in the control reperforator 203 until reception is completed, to store in relay banks 5B– and 5D– information concerning directing and switching characters received in the text of incoming messages and at the end of a message to start the transmitter portion of the control reperforator transmitter 203, and, in accordance with the information stored, to transmit the message via send relay 450 to typing reperforator 451, or to discard the message. The line reperforator transmitter 103 is interposed between the incoming line 300 in Fig. 3, and the control reperforator transmitter 203 of Fig. 2. Under ordinary circumstances the line reperforator transmitter 103 immediately repeats all received signals to the control reperforator transmitter 203. If for some reason the control transmitter 203 becomes disabled, the number of messages accumulated may exceed the storage capacity of the relay banks of Fig. 5 and accordingly provision is made in the circuit to arrest line transmitter 103, thereby to prevent retransmission to the control reperforator 203 and permit the line reperforator to continue reception and tape storage of incoming line traffic.

The format of each message in the illustrated embodiment of this invention, comprises a preamble including the activate characters FIGURES F FIGURES and a directing code which may contain the characters G or K, followed by the text of the message which may contain the control character FIGURES B, and ending with the end-of-message character FIGURES F. The circuit of the invention will transmit to the typing reperforator all messages containing a FIGURES B in the body of the message and will discard all messages preceded by a directing code containing the letters G or K as well as all messages not containing a FIGURES B. When the character FIGURES F FIGURES is received at the beginning of a message, contacts of selector mechanism 200 associated with control reperforator 203 will operate to complete a circuit to the stepping magnet 610 of rotary selector 601, which selector will step once. The stepping of selector 601 effects the selection of one relay level in each of two relay storage banks 5B– and 5D– for subsequent read in of directing information and initiates scanning by control transmitter 203 of the message material perforated in the control reperforator. If the next character received is a G or K, the relay 5B1 will be energized. If in the body of the message a FIGURES B switching character appears, relay 5D1 will be energized. Relays in the storage banks 5B– and 5D– are energized only in response to the specific code sequences hereinabove mentioned. After selector 601 steps, transmitter 203 scans and sets up in its associated transmitter contacts the codes for FIGURES F FIGURES. In response thereto a relay chain energizes the stepping magnet 620 of selector 602 which steps to arrest transmitter 203 and to prepare the selected relays in banks 5B– and 5D– for read out of the information stored therein. As the end-of-message signals are received by reperforator 203, the transmitter portion is restarted and if the storage relays 5B– and 5D– indicate that a message should be discarded, the send relay 450 will be short circuited; otherwise transmission is repeated to the typing reperforator 451. At this point the selector 601 allocated to reperforator 203 steps again and the foregoing sequence of operation is repeated for the next message. Sequentially, messages are transmitted to the typing reperforator or discarded in accordance with the condition of the relays in banks 5B and 5D set up in advance of the transmitter operation. There are eleven relays provided in each storage group of the embodiment illustrated.

The operation of the circuit will now be described in detail. Refer again to Figs. 1 to 6. The incoming line 300 extends through an operating winding on receiving relay 301 which is equipped with an obvious biasing circuit and which repeats all incoming signals to the selector magnet 101 of the line reperforator 103 via conductor 302. The transmitter portion of the line reperforator transmitter 103 of Fig. 1 is normally conditioned to repeat the signals perforated, by the action of selector magnet 101, in tape, through its transmitting contacts and over conductor 303 to the winding of relay 401 of Fig. 4. Relay 401 retransmits these signals over conductor 402 to selector magnet 201 of the control reperforator transmitter 203 in Fig. 2. With the circuit in the normal condition the rotatable arms of each of selectors 601 and 602 are each in engagement with the number 1 terminals of their respective banks 1 to 4. Relay 405 is operated over an energizing path extending from ground through the No. 1 brush arm of selector 602, the conductor connecting the No. 1 terminals of selectors 601 and 602, through the No. 1 brush arm of selector 601, over conductors 603 and 404 and the winding of relay 405 to negative battery. Operated relay 405 opens at its contact 1 the operating path for the control transmitter clutch release magnet 202, which path extends from negative battery through the winding of magnet 202, conductor 406, contact 1 of relay 405, when closed, conductor 471, transmitter stop contact 219, and conductor 452 to ground.

The armature of the universal relay 4UN is operated to close its contact 1 due to the bias current in winding 407 via resistors 408 and 409. Contact 8 of selector mechanism 200 is a universal contact and closes once for every character received by the reperforator select magnet 201. When contact 8 closes, ground is applied over conductor 452 to conductor 410 through the operating winding of relay 4UN to negative battery. The current in the operating winding 410 is sufficient to overcome the bias current in winding 407 and operate the armature of relay 4UN to open the circuit completed at its No. 1 contact.

The first significant characters received at the beginning of message transmission by line relay 301 are FIGURES F FIGURES, representing activate characters, followed by XXJ letters representing call directing characters. These characters are perforated in tape by the action of the line reperforator select magnet 101 and then relayed by the associated transmitter over conductor 303 to relay 401, which in turn repeats these characters to the control reperforator select magnet 201. As selector magnet 201 repeats the FIGURES signal, contact 1 of selector mechanism 200, will close momentarily to ground conductor 220 and effect the operation of relay 420 over an energizing path extending from ground at FIGURES contact 1 over conductor 220, through the No. 1 contact of relay 422, the winding of relay 420, conductor 461, resistor 409 to negative battery. Relay 420 operates in series with the bias winding 407 of relay 4UN. When universal contact 8 of selector mechanism 200 closes at the end of the character, as hereinabove described, the current in winding 410 of relay 4UN is insufficient to hold the armature thereof away from its contact 1 due to the increased current in the primary winding 407 now in series with the winding of relay 420. Relay 420 operates and locks to ground through the armature and No. 1 contact of relay 4UN, over a path extending from negative battery, the lower winding and No. 3 contact of relay 420, contact 2 of relay 425, contact 3 of relay 422, through the No. 1 contact and armature of relay 4UN to ground. As the next character F is received, selector magnet 200 closes selector contact 3 to apply ground over conductor 221, through contact 2 of operated relay 420, to one terminal of the winding of relay 421. The other terminal of relay 421 is connected over conductors 462, 463, and 461 to the primary winding 407 of relay 4UN, and therethrough in series to negative battery. Accordingly, relay 421 operates and closes its Nos. 1 and 2 contacts to effect the operation of relays 422 and 521. Relay 521 is energized over a path extending from ground through the No. 1 contact of operated relay 421, over conductor 621, conductor 522, the winding of relay 521 to negative battery. Relay 422 operates and locks to the armature of relay 4UN, through its No. 4 contact. Relay 422, at its No. 2 contact transfers conductor 220 to the operating winding of relay 423. Relay 422, in operating, also opens at its No. 3 contact a previously traced locking path for relay 420, which relay releases. The next following characters is again FIGURES which effects the closure of contact 1 of selector 200 and the application of ground over conductor 220, through the No. 2 contact of operated relay 422, through the winding of relay 423, over conductor 463, conductor 461, primary winding 407 of relay 4UN to negative battery, thereby operating relay 423. Relay 423 operates and locks through its secondary winding and its associated contact 2 to ground at the No. 5 contact of operated relay 422.

Relay 521 energized by the operation of relay 421 as hereinabove described, closes its associated No. 1 contact to apply ground through the No. 1 contact of relay 524, the winding of relay 610 to negative battery. Relay 610 is the stepping magnet for rotary selector 601 and effects the single stepping of is associated selector banks each time it is deenergized. When relay 521 operated it also closed a path through its No. 2 contact to enable the operation of relay 524. Thermistor 523 in the circuit of relay 524 is provided to protect the stepping selector magnet 610, and in the event relay 521 is held energized for an abnormal period, thermistor 523 will decrease in resistance during this period and enable operation of relay 524 after an appropriate timed interval and the release of rotary selector stepping magnet 610. However, under normal conditions, the receipt of the character F, following the FIGURES signal which resulted in the energization of stepping magnet 610, effects the release of relay 420, as hereinabove described, and the opening at the No. 1 contact of relay 420 of the previously traced operating path for relay 521. Thus, relay 521 releases to open the operating circuit of stepping magnet 610, which releases and steps rotary selector 601 to its No. 2 terminal.

As hereinabove described the transmitter start relay 405 was held operated from ground through the No. 1 brushes of selectors 601 and 602. However, when stepping relay 610 operates and releases, selector 601 moves from the No. 1 to the No. 2 terminal, thereby opening this previously traced operating path for relay 405 which releases to close its No. 1 contact and complete the previously traced operating path for the control transmitter clutch release magnet 202 which operates to start transmitter 203. As transmitter 203 begins scanning, the characters presented in the tape perforated in a manner well known in the art by equipment associated with selector magnet 201, the first significant characters scanned will be FIGURES F FIGURES XX letters, as mentioned above. When the FIGURES character is programmed in the maze contacts 250 associated with transmitter 203 in a manner well known in the art and described in the aforementioned Branson et al. patent, a ground will be presented on conductor 226 to operate relay 426 via the No. 1 contact of relay 427. Relay 426 is held operated momentarily through its secondary winding by the potential drop across resistor 481. When the following character F is scanned by the maze contacts ground is applied to conductor 227 and is extended thereover through the No. 2 contact of held-operated relay 426, to one terminal of the winding of relay 427, the other terminal thereof being connected to negative battery. Consequently relay 427 operates and locks to relay 528 in Fig. 5, over a path extending from negative battery, through the winding and No. 3 contact of relay 427, over conductor 627, and through the No. 3 contact of relay 528 to ground. The next following character scanned by the transmitter is FIGURES, and ground is reapplied to conductor 226; however, as relay 427 is operated this ground is extended through contact 2 of relay 427 and through the winding of relay 428 to negative battery. Relay 428 operates and applies ground at its No. 2 contact over conductors 628 and 529, through the winding of relay 528 to negative battery, thereby operating relay 528. The operation of relay 528 performs functions analogous to those described hereinabove with relation to relay 521, and accordingly stepping selector magnet 620 is operated and released thereby to step selector 602 from its No. 1 terminal to its No. 2 terminal on all banks. Operated relay 428 locks through its No. 1 contact to ground applied over conductor 283 from conductors 452 and 485 and the distributor auxiliary contact 284. Relay 427 which was held locked through its No. 3 contact over conductor 627 and through the No. 3 contact of relay 528 is released by the operation of relay 528. Thus, relay 428 operates to energize relay 528 which in turn operates and releases selector stepping relay 620 to step selector 602 to its No. 2 terminal. The No. 1 brush of selector of 602 reapplies ground over conductors 603 and 604 to reenergize the transmitter stop relay 405 which opens the circuit of relay 202 to stop the control reperforator transmitter 203.

It should be noted that during the scanning and selection operations just described, control reperforator selector magnet 201 is repeating all signals received from the line transmitter 104 and accordingly the body of the message is being perforated in tape. Relays 5B1 through 5B11 in Fig. 5, are connected via conductors 631 through 641, respectively to brush 3 of selector 601, said brush being connected over conductor 625 and through the No. 2 contacts of relay 425 to ground. Relays 5D1 through 5D11 are connected over conductors 651 through 661, respectively to the No. 4 brush of selector 601, said No. 4 brush being connected over conductor 624, through the No. 1 contact of relay 424 to ground.

If a G or K directing character is present in the preamble of the message, contacts 4 or 5 of selector mechanism 200 will close thereby applying ground over conductor 224 through the No. 1 contact of operated relay 423, to unbiased winding terminal of relay 424, thereby operating that relay in series with the primary winding 407 of relay 4UN. Operated relay 424 will apply ground through its No. 1 contact over conductor 624, through the No. 4 brush of selector 601 and its No. 2 terminal, over conductor 652, through the winding of relay 5D2 to negative battery, thereby operating that relay. Relay 5D2 operates and locks through its No. 2 contact, over conductor 535, through the No. 1 contact of relay 509 to ground. If the body of the message received by selector magnet 201 contains the character FIGURES B, the FIGURES contact 1 in selector mechanism 200 closes to operate relay 420, as previously described, and thereafter the B contact 2 closes to apply ground over conductor 225 and operate relay 425, through the No. 2 contacts of relays 420 and 421, operated in response to the FIGURES signal as hereinabove described. Relay 5B2 operates and locks through its No. 2 contact over conductor 536 and through the No. 2 contact of relay 509. The operating path for relay 5B2 is traced from ground through the No. 2 contact of operated relay 425, conductor 625, the No. 3 brush and terminal 2 of selector 601, conductor 632, and the winding of relay 5B2 to negative battery. When the FIGURES F signal is received at the end of the message, as hereinabove described, selector 601 and brush 1 will be stepped to its third terminal breaking the ground circuit for transmitter magnet 405 which will release to start the transmitter 204; and relays 5B3 and 5D3 will be connected to store the directing information in a manner hereinbefore described in relation to relays 5B2 and 5D2. As the control transmitter 204 begins to transmit, signals appearing on conductor 403 are applied to the winding of the sending relay 450 which repeats those signals via its armature and No. 1 contact to the associated typing reperforator 452 and selector magnet 451. It is to be noted that conductor 503 also terminates at the same terminal of relay 450 as conductor 403. Accordingly, if ground is continuously present on conductor 503 it will effectively short-circuit the repetition of any signals received by relay 450 over conductor 403. Conductor 503 extends from the junction of conductor 403 and the winding of relay 450 through the No. 3 contact of relay 5B2 released or the No. 3 contact of relay 5D2 operated, conductor 612, the No. 2 terminal and brush of bank 4 of selector 602 to ground. It is to be noted, however, that if either relay 5B2 is released or relay 5D2 is operated in response to received character G or K directing code, the message will be discarded as a continuous ground will be applied to the junction point of conductors 503, 403 and the winding of relay 450, thereby to short-circuit relay 450 and prevent the repetition of signals programmed by the control transmitter 204.

When the code combination FIGURES F is scanned at the end of a message transmission, selector 602 will advance to step 3 as hereinabove described and negative battery at brush 3 of selector 602 will be connected over conductor 672 and through either contacts 1 or 2 of relays 5B2 and 5D2 to one terminal of those relays and oppose the negative battery normally applied to the other winding of those relays, and thereby to force the release of relays 5B2 and 5D2. A sequence of operations, identical to that described hereinabove with respect to relays 5B2 and 5D2, will be followed throughout the storage levels of relay banks 5B and 5D for each subsequent received message. Therefore, the transmission of each message will be repeated from the line reperforator transmitter 104 to the control reperforator transmitter 204, and thence to the typing reperforator 452. However, the transmitter portion of the control reperforator transmitter will always be at least one message behind the receiving portion of the control reperforator transmitter. The messages are relayed to the typing reperforator 452 or discard in accordance with the pattern of the 5B and 5D relays set up by the reception of the control signals in each message in advance of the transmitter operation.

As the storing capacity of the circuit is eleven messages in the circuit embodiment illustrated herein, the control reperforator transmitter must not be stopped during reception of a sequence of messages in order to preclude the loss of synchronization after the receipt of the eleventh activate characters at the beginning of the eleventh message. To insure against the happening of this condition, the torn tape control and the manual transmitter stop key of the control reperforator transmitter are so arranged that whenever the reperforator transmitter is stopped either manually or automatically, the line transmitter is arrested.

A machine alarm for the line reperforator transmitter is provided by relays 330 and 336 in circuit combination with electronic tube 350. Incoming signals over transmission line 300 are repeated by relay 301 to relay 330 which is energized in accordance with the spacing pulses received over transmission line 300. The operation of relay 330 in response to spacing pulses applies positive battery, through its No. 1 contact to timing capacitors 331 and 332 in the circuit of electronic tube 350. When the line reperforator is operated in the normal manner, the universal contacts 1 and 2 of selector mechanism 100 will alternately ground capacitors 331 and 332 over conductors 333 and 334 from ground applied to conductor 335. This operation precludes capacitors 331 and 332 from receiving a charge appreciable enough to fire tube 350. However, in the event relay 330 is periodically operated from incoming line signals and the universal contacts of selector 100 are inoperative, the charge on either capacitor 331 or 332 will build up to a voltage sufficient to overcome the negative 48-volt bias connected to the grids through resistors 335 and 336 after a predetermined time interval to cause current flow in the associated plate circuit of tube 350 and the operation of relay 336. Relay 336 operates and applies ground through its No. 2 contact, over conductor 337, through the winding of relay 338 to negative battery, thereby to operate relay 338. Relay 338 operates to close energizing circuits for an alarm lamp and an alarm buzzer. A circuit is complete from negative battery through the No. 1 contact of relay 336, the No. 6 contact of relay 338, over conductor 339, to the alarm lamp 130 which lights. A second path is complete from negative battery through the No. 3 contact of relay 320, the No. 3 contact of relay 338, over conductor 340, and conductor 235 to the audible alarm buzzer 230 in Fig. 2. The station operator, in response to the operation of buzzer 230 and the energization of lamp 130, will operate the alarm release key 131 to apply ground over conductor 132, through the winding of relay 320 to negative battery, thereby operating relay 320. Relay 320 operates and opens at its No. 3 contact the energization path for a buzzer 230 which is deenergized. Relay 320 also locks through its No. 2 contact and the No. 4 contact of relay 338 to ground. The machine trouble lamp 130 will remain energized until the trouble is cleared. A tight tape condition will open contacts 139 and thereby disconnect ground from conductors 333 and 334 which will fire tube 350 in both triodes to bring in alarms in a manner identical to that just described.

When the reel of tape associated with the line reperforator transmitter 103 becomes low, the tape reel contacts 133 will be operated to apply ground over lead 341 to the winding of relay 342 which operates. The operation of relay 342 effects the operation of relay 338 through the No. 1 contact of relay 342. The operation of relay 338, as hereinabove described, results in the sounding of the audible alarm and the energization of the tape-out lamp. The buzzer may be silenced as hereinabove indicated.

If the tape becomes torn, the six-pin contact will apply ground over conductor 343 to cause the operation of relay 344. Relay 344 effects the operation of relay 342 through its No. 2 contact, which in turn energizes relay 338. The operation of relay 338 effects the energization of the audible alarm and the tape-out lamp. In addition, relay 344 effects by closure of its No. 1 contact the operation of the transmitter stop relay 305. Relay 344 locks to its No. 3 contact and the No. 2 contact of relay 338 to ground. The transmitter may be stopped independently by operation of key 135, which applies ground over conductors 346 and 345, through the winding of relay 305 to negative battery, to energize transmitter-stop relay 305; and open the transmitter start circuit of conductors 351, 352 and transmitter clutch release magnet 102.

The operation of the alarm circuits for the control reperforator transmitter 203 is similar to those hereinabove described with respect to the line control transmitter 103 with a few minor exceptions. The control transmitter stop key 213 operates relay 444 by applying ground over conductor 443. Operated relay 444 applies ground through to its No. 2 contact, over conductor 404 through the winding of relay 405 to negative battery. This results in the energization of relay 405 and the opening of the associated contact 1 to deenergize the transmitter clutch magnet 202. To avoid the loss of synchronism, relay 444 operates transmitter stop magnet 305 of the line transmitter by applying ground through its associated No. 4 contact, over conductor 347 to the winding of relay 305. In the event of a trouble condition which results in loss of synchronism, the transmitters may be stopped by operating either the control or the line transmitter stop key 213 or 136. When both transmitters are stopped, reset key 136 may be operated to apply ground over conductor 348, through the No. 1 contacts of relay 430, over conductor 448, to the winding of relay 504. It is to be noted that the reset key is operative only when the control reperforator is not receiving traffic and relay 401 is not repeating signals to relay 430. Relay 504 operates and applies ground through its No. 1 contact to relay 505. Relay 504 also applies ground through its No. 2 contact to relay 509. Relay 505 operates and locks over conductor 506 to the No. 2 brush of selector 602. Relay 507 operates and locks over conductor 508 to the No. 2 brush of selector 601. Relays 505 and 507 effect by closure of their associated No. 2 contacts, the operation of relays 528 and 521, respectively; which relays, as hereinabove described, effect the operation of selector stepping magnets 620 and 610. The operating paths of magnets 620 and 610 extend through the off-normal contacts of the rotary selectors so that the operating paths are opened when the rotary selector armatures are fully operated and are released to drive the brushes to the next step. With relays 505 and 507 operated and locked, the above-described cycle is repeated, the selector stepping through the banks until relays 505 and 507 are released at ungrounded step 1 of each rotary selector. In addition, relay 505 operates relay 509 which opens the common locking ground path for relays 5B and 5D at their Nos. 1 and 2 contacts, respectively, thereby to cancel any previously stored information.

Although a specific embodiment of the invention has been shown in the drawings and described in the foregoing specification, it will be understood that the invention is not limited to the specific embodiments but is capable of modification, substitution and rearrangement of parts and elements without departing from the spirit of the invention.

What is claimed is:

1. A data control system comprising a source of successive digital code signal messages, a message storage device for storing a plurality of said messages, a plurality of signal storage devices in successive arrangement, means responsive to the storage by said message storage device of switching intelligence in each of said successive stored messages for conditioning a successive one of said signal storage devices, a transmitter for thereafter retransmitting said successive stored messages, and means including said transmitter for discarding certain of said successive stored messages in accordance with the condition of said signal storage devices associated thereto.

2. A data control system comprising a source of successive digital code signal messages, a message storage device for storing a plurality of said messages, a plurality of signal storage devices in successive arrangement, means responsive to the storage by said message storage device of switching intelligence in each of said successive stored messages for conditioning a successive one of said signal storage devices, means responsive to the storage by said message storage device of other intelligence prior to said switching intelligence in said stored message for precluding the conditioning of said signal storage device, a transmitter for thereafter retransmitting said successive stored messages, and means including said transmitter for discarding certain of said successive stored messages in accordance with the condition of said signal storage devices associated thereto.

3. A data control system including a source of code signal messages, a reperforator for storing a plurality of said messages, a tape transmitter for scanning and transmitting said plurality of stored messages, a plurality of successive relay pairs, a first rotary selector operably responsive to the storage of each successive one of said messages by said reperforator for preparing a successive one of said relay pairs, means selectively responsive to the storage by said reperforator of switching intelligence in said message for conditioning said prepared relay pair, means selectively responsive to the storage by said reperforator of other switching intelligence prior thereto in said message for precluding the conditioning of said prepared relay pair, a second rotary selector operably responsive to the scanning of said stored message by said transmitter for selecting said relay pair, and means including said transmitter for discarding said stored message in accordance with the condition of said selected relay pair.

References Cited in the file of this patent

UNITED STATES PATENTS 2,766,318 Bacon ------------------ Oct. 9, 1956
2,805,283 Stiles ------------------ Sept. 3, 1957